(12) United States Patent
Borsting et al.

(10) Patent No.: US 9,283,725 B2
(45) Date of Patent: Mar. 15, 2016

(54) METHOD AND MANUFACTURING LINE FOR MANUFACTURING WIND TURBINE BLADES

(71) Applicant: LM GLASFIBER A/S, Kolding (DK)

(72) Inventors: Dennis Andre Borsting, Kolding (DK); Quinyin Zhou, Arslev (DK); Jacobus Johannes Van Der Zee, Kolding (DK)

(73) Assignee: LM GLASFIBER A/S, Kolding (DK)

( * ) Notice: Subject to any disclaimer, the term of this patent is extended or adjusted under 35 U.S.C. 154(b) by 35 days.

(21) Appl. No.: 14/087,120

(22) Filed: Nov. 22, 2013

(65) Prior Publication Data

US 2014/0079838 A1    Mar. 20, 2014

Related U.S. Application Data

(62) Division of application No. 13/254,125, filed as application No. PCT/EP2010/052801 on Mar. 5, 2010, now Pat. No. 8,617,338.

(30) Foreign Application Priority Data

Mar. 6, 2009 (EP) .................................... 09154539

(51) Int. Cl.
*B29D 99/00* (2010.01)
*B29C 70/38* (2006.01)
(Continued)

(52) U.S. Cl.
CPC ............ *B29D 99/0025* (2013.01); *B29C 70/38* (2013.01); *B29C 70/443* (2013.01);
(Continued)

(58) Field of Classification Search
CPC ...... B29C 70/38; B29C 70/443; B29C 70/44; B29C 70/02; B29C 70/36; B29D 99/0025; B29D 99/0028; B29L 2301/085; F05B 2253/04; F05B 2280/6003; F05C 2253/04; Y02E 10/721
USPC ........................................................ 156/242
See application file for complete search history.

(56) References Cited

U.S. PATENT DOCUMENTS 4,133,711 A    1/1979  August et al.
4,591,402 A    5/1986  Evans et al.
(Continued)

FOREIGN PATENT DOCUMENTS

EP    1 310 531 A1    5/2003
EP    2 014 449 A1    1/2009
WO    00/32381 A1    6/2000

*Primary Examiner* — Philip Tucker
*Assistant Examiner* — Vicki Wu
(74) *Attorney, Agent, or Firm* — Nath, Goldberg & Meyer; Jerald L. Meyer

(57) ABSTRACT

Manufacturing line for manufacturing wind turbine blades having a composite shell structure comprising a matrix material and a fiber reinforcement material by use of a resin transfer molding process is used to assemble wind turbine blades formed in a number of molds, including at least a first mold part having a first mold cavity. A gantry moves along the manufacturing line, in which the manufacture includes a) arranging fiber reinforcement material in the first mold cavity of a first mold using the gantry means, b) moving the gantry means along the manufacturing line to a second mold, c) supplying curable matrix material into the first mold cavity of the first mold, while substantially simultaneously arranging fiber reinforcement material in the first mold cavity of a second mold using the gantry means. The manufacturing line comprises a plurality of molds for forming wind turbine blades.

2 Claims, 5 Drawing Sheets

(51) Int. Cl.
*F03D 1/06* (2006.01)
*B29C 70/44* (2006.01)
*B29C 70/30* (2006.01)
*B29C 70/02* (2006.01)
*B29C 70/36* (2006.01)
*B29L 31/08* (2006.01)

(52) U.S. Cl.
CPC ............ *B29D99/0028* (2013.01); *F03D 1/065* (2013.01); *B29C 70/02* (2013.01); *B29C 70/30* (2013.01); *B29C 70/36* (2013.01); *B29C 70/44* (2013.01); *B29L 2031/085* (2013.01); *F05B 2280/6003* (2013.01); *F05C 2253/04* (2013.01); *Y02E 10/721* (2013.01)

(56) References Cited

U.S. PATENT DOCUMENTS

| | | |
|---|---|---|
| 4,679,291 A | 7/1987 | Schmeal et al. |
| 2003/0116262 A1* | 6/2003 | Stiesdal et al. ............... 156/245 |
| 2006/0042066 A1 | 3/2006 | Nelson |
| 2006/0172636 A1* | 8/2006 | Bech ................................ 442/1 |
| 2006/0188378 A1* | 8/2006 | Bech et al. ................ 416/227 R |
| 2007/0251641 A1* | 11/2007 | Santos Gomez et al. ..... 156/285 |
| 2010/0304170 A1* | 12/2010 | Frederiksen ............... 428/542.8 |

* cited by examiner

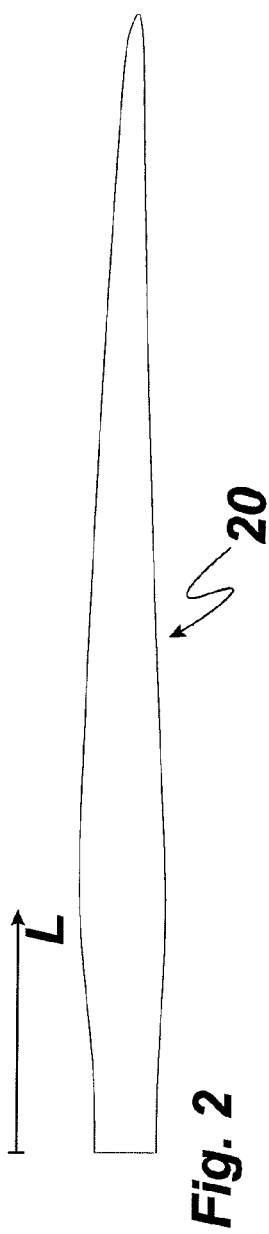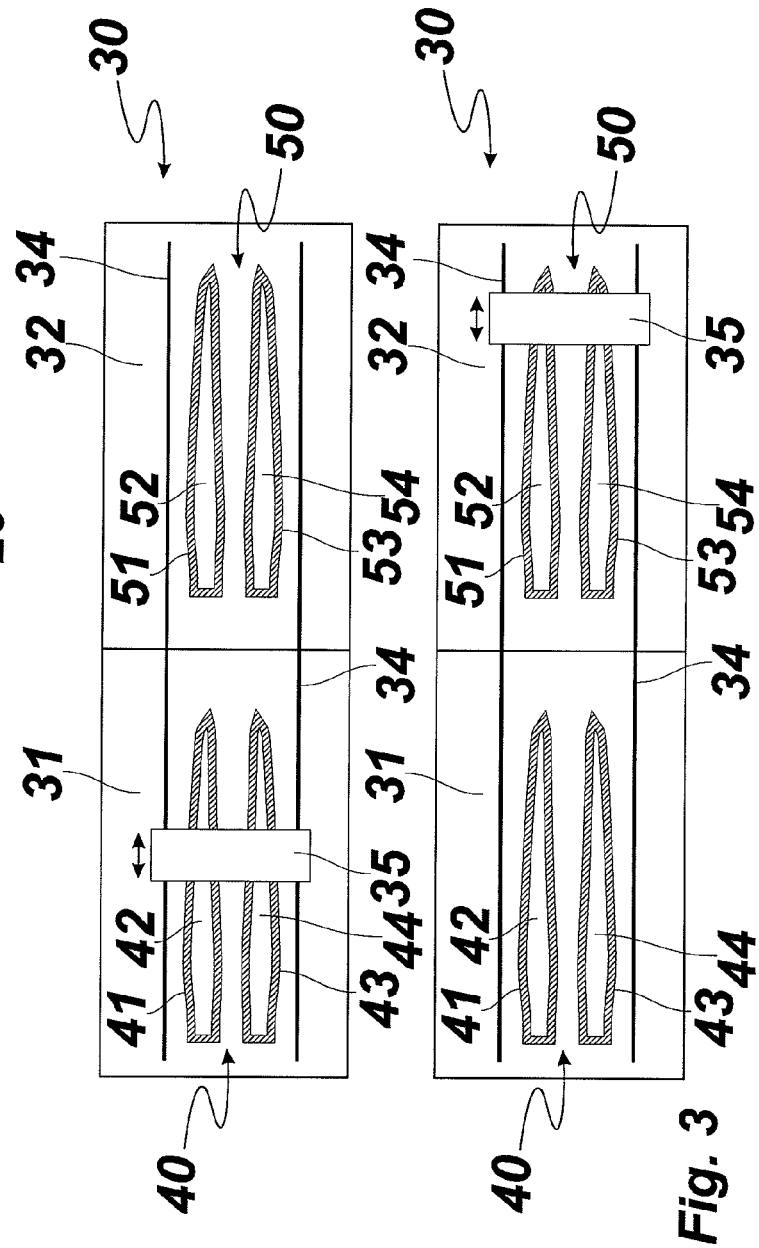

METHOD AND MANUFACTURING LINE FOR MANUFACTURING WIND TURBINE BLADES

This is a Divisional Application of U.S. patent application Ser. No. 13/254,125, filed Nov. 18, 2011, which is a national phase under 371 of PCT/EP10/52801 with an international filing date of Mar. 5, 2010 and claims priority to EP 09154539.2 filed Mar. 6, 2009, the entire content of which is hereby incorporated by reference in its entirety.

TECHNICAL FIELD

The present invention relates to a method for manufacturing wind turbine blades having a composite shell structure comprising a matrix material and a fibre reinforcement material by use of a resin transfer moulding process. The invention also relates to a manufacturing line for manufacturing wind turbine blades having a composite shell structure comprising a matrix material and a fibre reinforcement material by use of a resin transfer moulding process.

BACKGROUND ART

It is known to manufacture wind turbine blades using project oriented manufacturing methods, e.g. where each of the wind turbine blades are moulded and assembled at the same work shop, whereafter the wind turbine blade optionally is moved to another work shop, typically a finishing work shop, where the wind turbine blade is cut, trimmed, painted and the final fittings are mounted on the wind turbine blade. The wind turbine blades are often made of fibre-reinforced polymer and are usually manufactured as shell parts in moulds, where the top side and the bottom side of the blade profile (typically the pressure side and suction side, respectively) are manufactured separately by arranging glass fibre mats in each of the two mould parts and injecting a liquid resin, which subsequently is cured. Afterwards, the two halves are glued together, often by means of internal flange parts. Glue is applied to the inner face of the lower blade half before the upper blade half is lowered thereon or vice versa. Additionally, one or two reinforcing profiles (beams) are often attached to the inside of the lower blade half prior to gluing to the upper blade half.

The shell parts for the wind turbine blade are typically manufactured as fibre composite structures by means of VARTM (vacuum assisted resin transfer moulding), where liquid polymer, also called resin, is filled into a mould cavity, in which fibre reinforcement material priorly has been inserted, and where a vacuum is generated in the mould cavity, hereby drawing in the polymer. The polymer can be thermoset plastic or thermoplastics.

Vacuum infusion or VARTM is a process used for moulding fibre composite mouldings, where uniformly distributed fibres are layered in one of the mould parts, the fibres being rovings, i.e. bundles of fibre bands, bands of rovings, or mats, which are either felt mats made of individual fibres or woven mats made of fibre rovings. The second mould part is often made of a resilient vacuum bag, and is subsequently placed on top of the fibre reinforcement material. By generating a vacuum, typically 80% to 95% of the total vacuum, in the mould cavity between the inner side of the mould part and the vacuum bag, the liquid polymer can be drawn in and fill the mould cavity with the fibre reinforcement material contained herein. So-called distribution layers or distribution tubes, also called inlet channels, are used between the vacuum bag and the fibre reinforcement material in order to obtain as sound and efficient a distribution of polymer as possible. In most cases, the polymer applied is polyester or epoxy, and the fibre reinforcement is most often based on glass fibres and/or carbon fibres.

It is commonly known that moulds for making large articles, such as wind turbine blades, can consist of two mould parts that are closed about a longitudinal hinge line, where the hinges are passive, i.e. a crane is used to lift one of the mould parts about the hinge line for closure and opening of the mould. When making wind turbine blades, the mould is closed so as to glue two blade shell halves together, said shell halves being produced in separate mould parts. Alternatively, wind turbine blades can be manufactured as disclosed in EP 1 310 351.

However, as the demand for wind turbines is rapidly increasing it is found increasingly difficult to scale the conventional project oriented manufacturing method to accommodate the demand for several reasons as listed in the following: Firstly, the project oriented manufacturing method requires that all the materials required for manufacturing a wind turbine blade, e.g. resin and fibre reinforcement material, has to be transported to every work shop, which is logistically demanding. Secondly, every work shop has to be equipped with tools and gear necessary for every single manufacturing step in the process, which yields an overhead of resources. Additionally, the conventional project oriented manufacturing method requires a mould in every single work shop, which is expensive, since production and maintenance of moulds are time consuming and thus expensive. Furthermore, the conventional project oriented manufacturing method occupies a lot of space, and since the workers at each work shop has to perform a variety of manufacturing step, there is a risk that the quality of the manufactured wind turbine blades may suffer.

EP 2 014 449 A discloses a tool and method for producing wide parts of composite material by means of laying, cutting and hot-forming. The tool comprises two identical tables and a gantry with tool heads for operating on both tables. Each table is provided with a fleksibel membrane on which fibrous material is layed out and cut. Subsequently, parts are formed in a hot-forming process where a tool including a flexible forming membrane deforms the fibrous material under the influence of heat supplied by heating means. According to the specification of EP 2 014 449 A it is an important feature of the device that it has the ability to laminate, cut and form the stratified composite materials by means of heat in situ. However, such a hot-forming process using a flexible membrane forming tool and the use of means for heating the work piece to high temperatures as required for hot-forming are incompatible with the production of high precision wind turbine blades by use of a resin transfer moulding process.

It is therefore an object of the invention to obtain a new method and manufacturing line for manufacturing wind turbine blades, which overcome or ameliorate at least one of the disadvantages of the prior art or which provide a useful alternative.

DISCLOSURE OF INVENTION

The object of the invention is obtained by a method that comprises a manufacturing line, where wind turbine blades are formed in a number of moulds, each of the number of moulds comprising at least a first mould part comprising a first mould cavity, the manufacturing line further comprises a gantry means movable along the manufacturing line, wherein the method comprises the following steps: a) arranging fibre reinforcement material in the first mould cavity of a first mould using the gantry means, b) moving the gantry means along the manufacturing line to a second mould, c) supplying curable matrix material into the first mould cavity of the first mould, while substantially simultaneously arranging fibre reinforcement material in the first mould cavity of a second mould using the gantry means. Hereby, a method is provided whereby wind turbine blades can be manufactured using fewer resources e.g. moulds and tools, or alternatively improve the throughput as the method increases the number of manufactured wind turbine blades per time unit compared to conventionally project oriented manufacturing methods. As an example, the method can in a setup with three moulds and one gantry means increase the throughput from 3 to 6 wind turbine blades per 24 hours. Since the gantry means is movable in relation to the number of moulds, the method furthermore provides that the gantry means can be equipped with specialized and advanced equipment that is dedicated to the manufacturing step, i.e. arranging fibre reinforcement material, carried out by the gantry means, as the method reduces the required number of gantries. However, the method will also work with several gantries, such as 2, 3, 4 or 5, but will not be as cost efficient. Alternatively or additionally, the gantry means can be manned with specialized workers that are skilled and trained in the manufacturing step carried out at the gantry means. However, the gantry means can also be automated, e.g. by using robots, such that fewer workers are needed. Automation is also expected to additionally improve the quality of the manufactured wind turbine blades.

The supplied curable matrix material is typically infused and is preferably a resin, such as polyester, vinylester, or epoxy. The matrix material is injected by use of resin transfer moulding (RTM), wherein a positive pressure differential is used to inject the resin into the mould cavity, or by use of vacuum assisted resin transfer moulding (VARTM), wherein an underpressure is formed in the mould cavity, thereby drawing the liquid resin into the mould cavity.

The manufacturing line can also comprise a number of work stations in relation to the number of moulds. At least one work station is arranged at each of the number of moulds and the number of work stations are preferably equipped with tools and gear for performing RTM and/or VARTM and for closing the moulds and assembling web inside the wind turbine blade. The number of moulds are stationary in relation to the manufacturing line, but the first mould parts and/or the second mould parts of each of the number of moulds are operational, so that they can be assembled and form a closed mould assembly.

Arranging the fibre reinforcement material in the first mould cavities of each of the number of moulds are preferably carried out solely by use of the gantry means, while the remaining necessary manufacturing steps are carried out at each of the work stations arranged at each of the number of moulds.

The number of moulds are preferably arranged in extension of each other along the manufacturing line, preferably such that they form a substantially straight manufacturing line and the number of moulds are even more preferably placed in longitudinal extension of each other, however the method can also be performed with the moulds having a oblique or even transverse orientation in relation to the manufacturing line.

According to a first embodiment, the method further comprises the following steps: d) moving the gantry means along the manufacturing line to a third mould, e) supplying curable matrix material into the first mould cavity of the second mould while substantially simultaneously arranging fibre reinforcement material in a first mould cavity of a third mould using the gantry means. Thereby, only a single gantry means, for arranging fibre reinforcement material, is necessary at a time, since only one mould at a time has this manufacturing step carried out due to the sequential manufacturing steps according to the invention. The gantry means being movable along the manufacturing line can move within few minutes, e.g. 1, 2 or 3 minutes, between each of the number of moulds, thus using a minimum of transport time.

In another embodiment, the first mould comprises at least a first mould part and a second mould part that can be assembled to form a closed mould assembly, each mould part comprising a mould cavity. Thus, each mould part can be used so as to form separate shell parts of a wind turbine blade. The shell parts are typically constructed as a lower part, e.g. a suction side, of the blade, and an upper part, e.g. a pressure side, of the blade. The shell parts are then later adhered to each other, e.g. by gluing flanges located at the leading edge and trailing edge of the finished wind turbine blade. Thus, the mould part comprises a moulding surface, which defines a part of the outer side of the finished blade. The mould cavity of each mould part can be formed by sealing a vacuum bag to the mould part. A vacuum source can be coupled to the mould cavity so that the mould cavity can be evacuated prior to injecting the liquid matrix material.

Each of the number of moulds can have a first mould part and a second mould part that pairwise can be assembled to form a closed mould assembly, e.g. by sealing vacuum bags to the respective mould part. Each of the mould parts of each of the number of moulds comprises a mould cavity.

In another embodiment, the method further comprises the step of: closing the second mould and supplying curable matrix material into the first mould cavity of the third mould substantially simultaneously to step a), and/or closing the third mould substantially simultaneously to step c), and/or closing the first mould substantially simultaneously to step e), and/or moving the gantry means along the manufacturing line to the first mould. Hereby, the method provides a continuous manufacturing line. The method is particular efficient, if the time it takes to perform a manufacturing step or a group of manufacturing steps performed at each of the moulds is similar and thus balanced, such that each mould is used effectively and furthermore the gantry means can be continuously active. Therefore, in cases where the time it takes to perform a manufacturing step or a group of manufacturing steps on each of the moulds is significantly different, additional moulds can be added to the manufacturing line, such that a buffer zone is established or the time is balanced. In a preferred embodiment, the moulding line comprises three moulds and one gantry means. In another preferred embodiment, the gantry means arranges fibre reinforcement material on each of the number of moulds within 12 hours. In yet another embodiment, step b) and d) are each performed within 15 minutes, and in yet another embodiment step a) and c) are each performed within 1 or within 2 hours.

In another embodiment, the fibre reinforcement material is dry, e.g. not pre-impregnated with resin, when arranged in the number of moulds by the gantry means. However, the method can also be performed with pre-impregnated fibre reinforcement material or a combination thereof. The fibre reinforcement material and/or additional reinforcement material that may be pre-impregnated is preferably arranged in moulds such that a longitudinal reinforcement structure is formed and provides mechanical strength to the manufactured wind turbine blade.

In another embodiment, each of the number of moulds is arranged with at least one work station for supplying curable matrix material and/or for closing the mould. Hereby, the method provides that each of the number of moulds has a separate work station. The work stations are equipped with tools and gear for performing the required manufacturing steps, such as supplying curable matrix material, closing the mould and mounting web inside the wind turbine blade.

In another embodiment, the second mould is arranged in extension of the first mould and/or the third mould is arranged in extension of the second mould such that the number of moulds form an elongated and aligned manufacturing line. The advantage of such an elongated arrangement is that the manufacturing line is very accessible. Furthermore, by having the moulds aligned, it is very applicable to arrange a common gantry means for the number of moulds.

The elongated and aligned arrangement may be achieved in different ways. For example, a baffled/staggered alignment of the moulds may be contemplated, where the moulds are arranged parallel to each other and offset with respect to each other in a longitudinal direction. In one embodiment, the moulds are parallely translated/shifted with respect to each other in a direction at an angle with respect to the longitudinal direction. Any angle may be contemplated. However, advantageously said angle between the longitudinal axis and the direction of parallel translation/shift is less than 30 degrees, alternatively less than 20 degrees, alternatively in the range between 15 degrees and 5 degrees. Preferably, the gantry means is configured to travel/move along a direction substantially parallel to the direction of parallel translation/shift.

By such a baffled/staggered alignment a trade-off may be achieved between on the one hand reducing the width/span of the required gantry means, thereby increasing the stiffness and precision of the gantry means, and on the other hand reducing the total length of the manufacturing line comprising a plurality of moulds. An optimum balance may be found depending on the aspect ratio of the footprint of the mould and the workspace required around the mould. Reducing the required span of the gantry means has the advantage of increasing stiffness of the gantry allowing to improve the positioning precision for equipment attached to the gantry. Thereby, for example, the quality of the fibres arrangement can be improved.

Preferably, the second mould and the following number of moulds are arranged in substantially longitudinal extension of the first mould. Thereby the width of the required gantry means may be minimized with above-mentioned advantages.

In another embodiment, the gantry means is moved in the longitudinal direction of the number of moulds. Hereby, the gantry means can have a minimum of width, as the moulds have a width that is much smaller than the length. Thus the span of the gantry means is minimized. The gantry means can be movable along the manufacturing line by means of rollers and/or wheels and can be arranged on a rail.

In another embodiment, the method further comprises a number of web production stations. Hereby, the method also provides means for producing web for mounting inside the wind turbine blade. The number of web production stations is preferably the same as the number of moulds, however there can also be fewer web production stations than moulds. The tools and gear used at the work stations for supplying curable matrix material can also be used for manufacturing the web. However, the separate web production stations can also have separate equipment which is not shared with the number of work stations.

In another embodiment, a web production station is juxtaposed to each of the number of moulds on the manufacturing line. Hereby, the web is produced in the vicinity of each mould, where the web also is applied, which shortens the handling time.

In another embodiment, the method further comprises a finalisation line arranged in longitudinal extension of the manufacturing line. Hereby, the method provides an integrated method for producing wind turbine blades ready for installation. The finalisation line can comprise a number of finishing stations comprising a quality inspection station, a cut and trim station, a finish station and a painting station, where the cut and trim station and the painting station can be automated. The finalisation line is preferably placed in the same production hall as the manufacturing line, thus separate air cleaning facilities are required for some of the finishing stations to maintain a clean and acceptable working environment in the production hall. A crane means can be used for transporting the wind turbine blades from each of the number of moulds to the finalisation line.

In another embodiment, the manufactured wind turbine blades has a length of at least 30 meters, or 40 meters, or 50 meters.

In another embodiment, the method is performed in a production facility having a length of at least 250 meters and a width of at least 30 meters.

The object of the invention is also obtained by a manufacturing line that comprises a plurality of moulds for forming wind turbine blades, each of the number of moulds comprising at least a first mould part comprising a first mould cavity, and in that the manufacturing line further comprises a gantry means movable along the manufacturing line. Hereby, a manufacturing line is provided where a continuous production of wind turbine blades is possible. The manufacturing line requires fewer resources e.g. moulds and tools, or alternatively improves the throughput as compared to conventionally project oriented manufacturing methods. The manufacturing line can, as an example, in a setup with three moulds and one gantry means increase the number of manufactured wind turbine blades from 3 to 6 wind turbine blades per 24 hours. The manufacturing line can additionally be automated, which is expected to further improve the throughput and additionally the quality of the manufactured wind turbine blades.

According to a first embodiment, the number of moulds are arranged in longitudinal extension of a first mould. Hereby, a minimum of span is required by the gantry means since the moulds are elongated in the longitudinal direction. The manufacturing line can further comprise a finalisation line comprising a number of finishing stations comprising a quality inspection station, a cut and trim station, a finish station and a painting station, where the cut and trim station and the painting station can be automated. The finalisation line is preferably placed in the same production hall as the manufacturing line, thus separate air cleaning facilities are required for some of the finishing stations to maintain a clean and acceptable working environment in the production hall. The manufacturing line can further comprise a number of web production stations for producing webs for mounting inside the wind turbine blades. The number of web production stations is preferably the same as the number of moulds, however there can also be fewer web production stations than moulds. The tools and gear used at the work stations for supplying curable matrix material can also be used for manufacturing the web. However, the separate web production stations can also have separate equipment, that is not shared with the number of work stations.

BRIEF DESCRIPTION OF THE DRAWING

The invention is explained in detail below with reference to an embodiment shown in the drawings, in which FIG. 2 shows a prior art wind turbine blade, FIG. 3 shows a manufacturing line with a first work station, a second work station, a first mould, a second mould and a gantry means during step a) and c) according to one embodiment of the invention.

DETAILED DESCRIPTION

Figure 1:
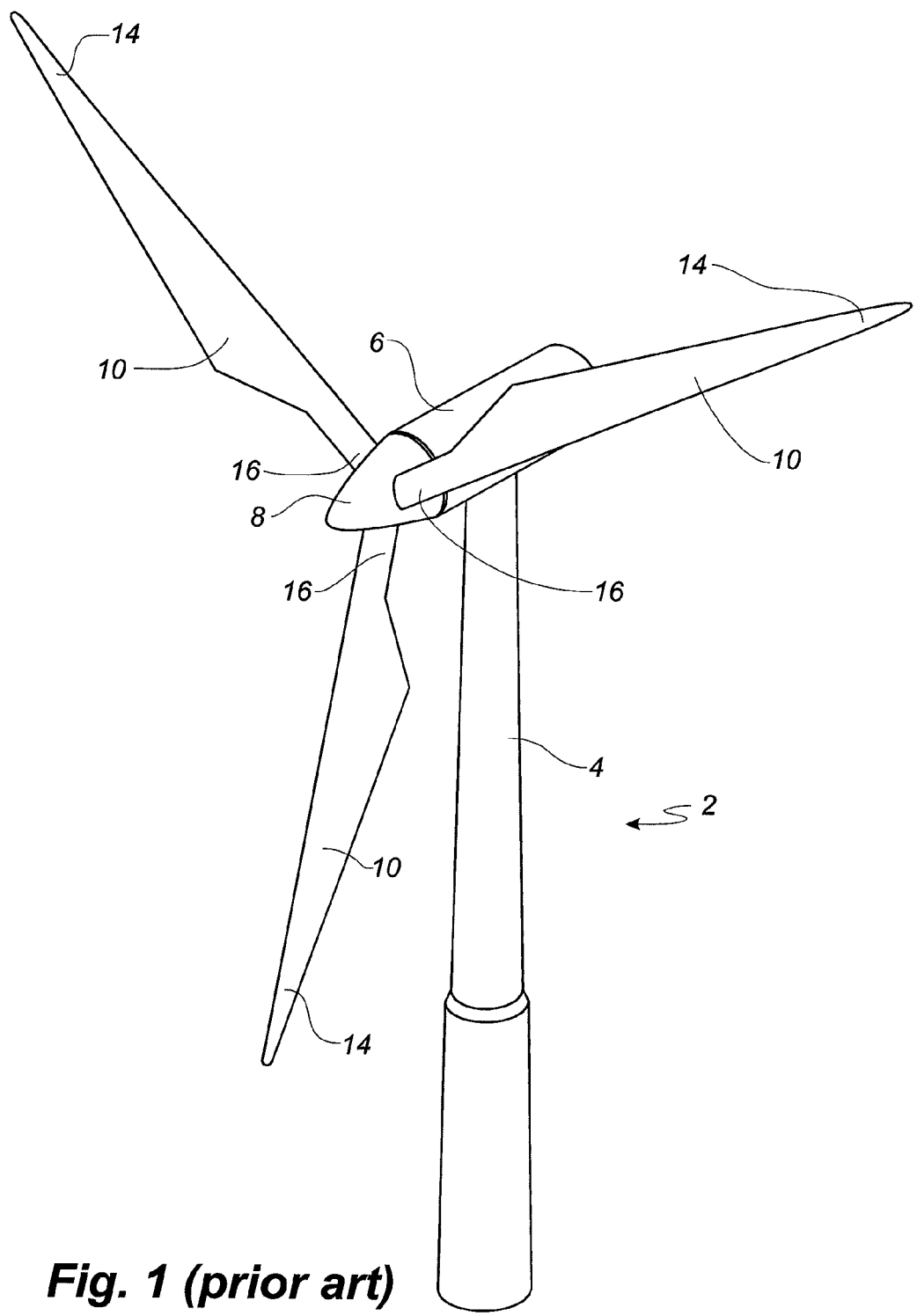
FIG. 1 shows a prior art wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub 8 and a blade tip 14 furthest from the hub 8.

FIG. 2 illustrates a conventional wind turbine blade 20, which conventionally is manufactured either in one piece or in two pieces, where each of the two pieces has the same length in the longitudinal direction L as a wind turbine blade assembled by the two pieces.

FIG. 3 illustrates a manufacturing line 30 with a first work station 31 and a second work station 32, a first mould 40 is located at the first work station 31 and a second mould 50 is located at the second work station 32. The first mould 40 comprises a first mould part 41 comprising a first mould cavity 42, the first mould cavity 42 corresponds to the envelope of the lower side of a wind turbine blade, e.g. the suction side of the blade, and a second mould part 43 having a second mould cavity 44 corresponding to the envelope of the upper side of a wind turbine blade, e.g. the pressure side of the blade. The second mould correspondingly comprises a first mould part 51 comprising a first mould cavity 52, the first mould cavity 52 corresponds to the envelope of the lower side of a wind turbine blade, e.g. the suction side of the blade, and a second mould part 53 having a second mould cavity 54 corresponding to the envelope of the upper side of a wind turbine blade, e.g. the pressure side of the blade. A rail means 34 is extending from the first work station 31 to the second work station 32. The rail means 34 has a length that at least equals the length of the first mould 40, the second mould 50 and a longitudinal distance between the first mould 40 and the second mould 50. Hereby, a gantry means 35 movable mounted on the rail means 34 can sweep the first mould 40 in the first work station 31 and the second mould 50 in the second work station 32 and can furthermore move from the first work station 31 to the second work station 32.

The gantry means is preferably used for arranging fibre reinforcement material in the first 41 and second mould part 43 of the first mould 40 at the first work station 31 whereafter the gantry means 35 is moved to the second work station 32, where the gantry means 35 is used for arranging fibre reinforcement material in the first 51 and second mould part 53 of the second mould 50. The arranging of fibre reinforcement material in the separate mould parts 51,53 of the second mould 50 is identical or at least substantially similar to the arranging of fibre reinforcement material in the separate mould parts 41,43 of the first mould 40, as the same gantry means 35 is used, however, differences may occur if the first mould 40 and the second 50 has different design and/or geometry. The way of arranging fibre reinforcement material is however described solely for the first mould 40 in the following, but the procedure is similar or even identical for the second mould 50. The arranging of fibre reinforcement material in each of the separate mould parts 41,43 can be carried out manually or in automated way, the gantry means 35 can either be shared by the separate mould parts 41,43 or separate gantries means for each separate mould part 41,43 can be used. The mould cavities 42,44 of the separate mould parts 41,43 are normally coated with a gelcoat or the like before the fibre reinforcement material is arranged. The fibre reinforcement material may comprise fibres in many forms such as tows, mats, prepregs and preforms. The fibres may be of any material, but is preferably made of glass and/or carbon. Alternatively plant fibres or metallic fibres, such as steel fibres, may be utilised.

After the gantry means 35 has arranged fibre reinforcement material in the separate mould parts 41,43 of the first mould 40, the first mould 40 is prepared for infusion of a curable matrix material, e.g. a liquid resin. Typically, a RTM or VARTM process is used, and the separate mould parts 41, 43 is each prepared by arranging resin inlet channels on top of the fibre reinforcement material in each of the separate mould parts 41,43. Subsequently, each separate mould part 41,43 is covered and sealed by an air tight vacuum bag, thus creating a mould cavity. Thereby, a vacuum can be created between the mould part 41, 43 and the vacuum bag, so that the curable matrix material can be drawn into the mould cavity and impregnating the fibre reinforcement material via the resin inlet channels. Typically, the matrix material is infused from the root area. The above described regarding supplying curable matrix material also applies for the second mould 50 after fibre reinforcement material has been arranged.

Figure 4:
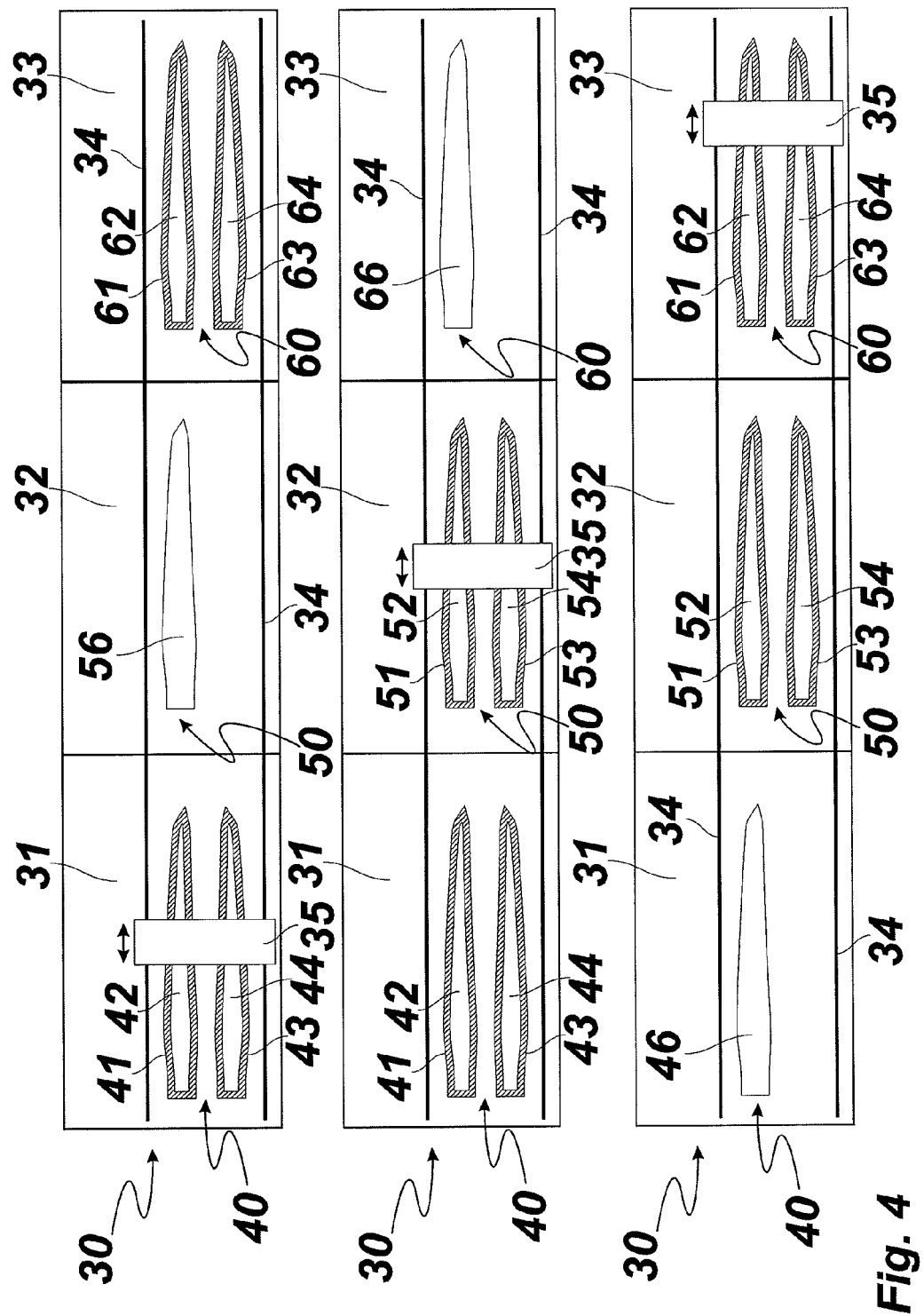
FIG. 4 shows a manufacturing line with a first work station, a second work station, a third work station, a first mould, a second mould, a third mould and a gantry means during step a), c) and e) according to another embodiment of the invention.

FIG. 4 illustrates a manufacturing line 30 similar to that depicted in FIG. 3. However, the manufacturing line 30 has been extended with a third work station 33 following the second work station 32. A third mould 60 is located at the third work station 33 and the third mould 60 comprises a first mould part 61 comprising a first mould cavity 62, the first mould cavity 62 corresponds to the envelope of the lower side of a wind turbine blade, e.g. the suction side of the blade, and a second mould part 63 having a second mould cavity 64 corresponding to the envelope of the upper side of a wind turbine blade, e.g. the pressure side of the blade. Furthermore the rail means 34 has been extended from the second work station 32 to the third work station 33, so that the gantry means 35 also is movable from the second work station 32 to the third work station 33 and along the entire longitudinal length of the third mould 60. FIG. 4 illustrates the manufacturing line 30 at three different points in time while performing the method according to the invention and the method having reached a steady state, e.g. when a continuous manufacturing of wind turbine blades is established.

At a first point in time, the gantry means 35 is operating in the first work station 31 where the gantry means 35 is used for arranging fibre reinforcement material in the separate mould parts 41,43 of the first mould 40. At the same point in time, curable matrix material is supplied to the third mould 60 located at the third work station 33, while the separate mould parts 51,53 of the second mould 50 at the second work station 32 is assembled, so a closed second mould assembly 56 is formed.

At a second point in time, occurring after the first point in time, the gantry means 35 has moved to the second work station 32, where the closed second mould assembly 56 has been opened and the manufactured wind turbine blade removed, so that the separate mould parts 51,53 of the second mould 50 is ready for receiving new fibre reinforcement material arranged by the gantry means 35. At the same point in time, curable matrix material is supplied to the first mould 40 at the first work station 31, which at the first point in time had fibre reinforcement material arranged. Furthermore, at the same point in time, the separate mould parts 61,63 of the third mould 60 at the third work station 33 is assembled, so a closed third mould assembly 66 is formed.

At a third point in time, occurring after the second point in time, the gantry means 35 has moved to the third work station 33, where the closed third mould assembly 66 has been opened and the manufactured wind turbine blade removed, so that the separate mould parts 61,63 of the third mould 60 is ready for receiving new fibre reinforcement material arranged by the gantry means 35. At the same point in time, curable matrix material is supplied to the second mould 50 at the second work station 32, which at the second point in time had fibre reinforcement material arranged. Furthermore, at the same point in time, the separate mould parts 41,43 of the first mould 40 at the first work station 31 is assembled, so a closed first mould assembly 46 is formed.

Hereafter the gantry means 35 can be moved back to the first work station 31, where the above described procedure can be repeated, after opening the closed first mould assembly 46, so that the separate mould parts 41,43 of the first mould 40 is ready for receiving new fibre reinforcement material arranged by the gantry means 35.

Figure 5:
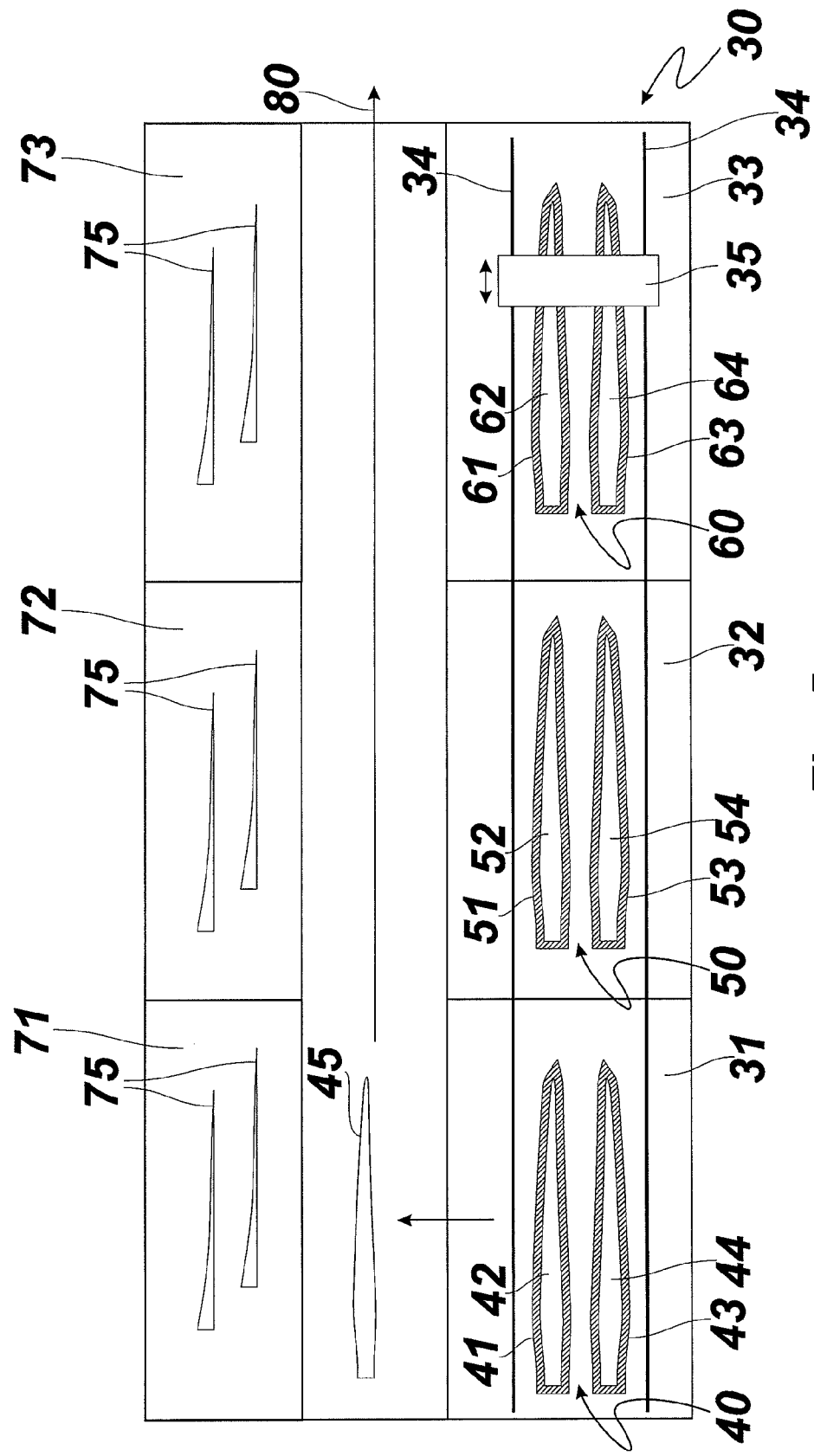
FIG. 5 shows a manufacturing line as illustrated in FIG. 4 and a first, second and third web production station according to a further embodiment the invention.

FIG. 5 illustrates the manufacturing line 30 as shown in FIG. 4 but with a first 71, a second 72 and a third web production station 73 for supplying web 75 for insertion into the wind turbine blades. The web production stations 71,72,73 are preferably juxtaposed to the manufacturing line 30 such that each of the web production stations 71,72,73 can supply at least one of the work stations 31,32,33 with web. The manufacturing line 30 can also comprise a finalisation line arranged in longitudinal extension of the manufacturing line 30, where the finalisation line can comprise a number of finishing stations comprising a quality inspection station, a cut and trim station, a finish station and a painting station, where the cut and trim station and the painting station can be automated. The finalisation line is preferably placed in the same production hall as the manufacturing line, thus separate air cleaning facilities are required for some of the finishing stations to maintain a clean and acceptable working environment in the production hall. A crane means can be used for transporting the manufactured wind turbine blades 45 from each of the number of moulds to the finalisation line as illustrated by a transport arrow 80.

Figure 6:
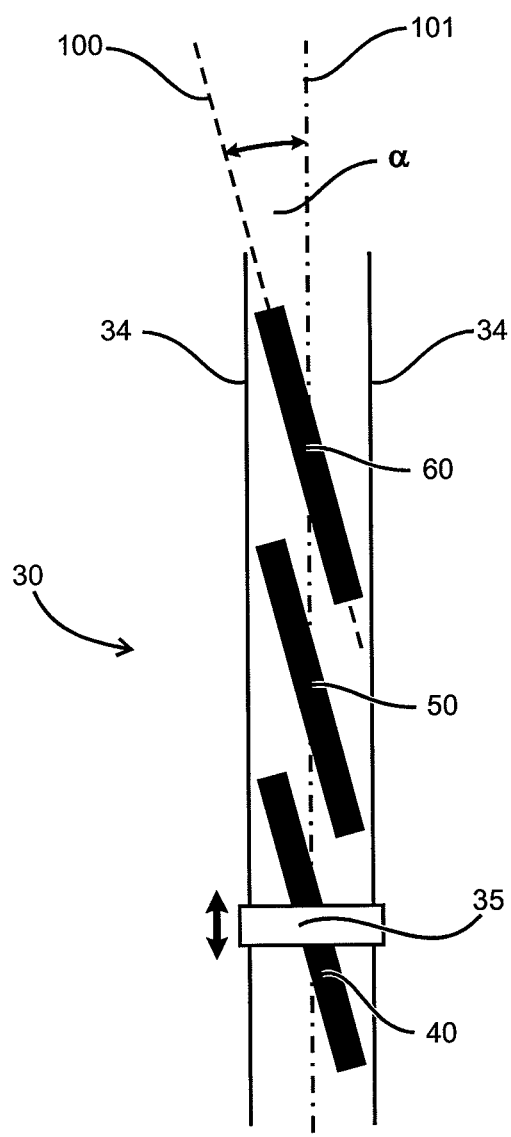
FIG. 6 shows a manufacturing line with a first work station, a second work station, a third work station, a first mould, a second mould, a third mould in a baffled/staggered alignment and a gantry means according to a further embodiment of the invention.

FIG. 6 shows a manufacturing line 30 with a first work station, a second work station, a third work station, a first mould 50, a second mould 40, a third mould 60 in a space-saving baffled/staggered alignment. The moulds 40, 50, 60 are substantially parallel to each other and offset with respect to each other in a longitudinal direction 100. The moulds 40, 50, 60 are thus parallely translated/shifted with respect to each other in a direction 101 at an angle α with respect to the longitudinal direction 100 of the moulds 40, 50, 60. Thereby the second mould 50 is arranged in extension of the first mould 40 and the third mould 60 is arranged in extension of the second mould 50 such that the moulds 40, 50, 60 form an elongated and aligned manufacturing line 30. The angle α between the longitudinal axis 100 and the direction 101 of parallel translation/shift is advantageously less than 30 degrees, alternatively less than 20 degrees, alternatively in the range between 15 degrees and 5 degrees. Gantry means 35 are provided on rails 34 and may be moved on these rails 34 in a direction substantially parallel to the direction 101 of parallel translation/shift between the moulds 40, 50, 60.

The method and the manufacturing line 30 can also be performed where the moulds 40, 50, 60 are closed, so the form closed mould assemblies 46,56,66, before supplying curable matrix material, such that an integral wind turbine blade is formed, e.g. without a seam.

The invention has been described with reference to a preferred embodiment. However, the scope of the invention is not limited to the illustrated embodiment, and alterations and modifications can be carried out without deviating from the scope of the invention.

REFERENCE NUMERALS 2 wind turbine
4 tower
6 nacelle
8 hub
10 blade
14 blade tip
16 blade root
20 wind turbine blade
30 manufacturing line
31 first work station
32 second work station
33 third work station
34 rail means
35 gantry means
40 first mould
41 first mould part (of first mould 40)
42 first mould cavity (of first mould part 41)
43 second mould part (of first mould 40)
44 first mould cavity (of second mould part 43)
45 wind turbine blade (shaped from the first mould 40)
46 closed first mould assembly
50 second mould
51 first mould part (of second mould 50)
52 first mould cavity (of first mould part 51)
53 second mould part (of second mould 50)
54 first mould cavity (of second mould part 53)
56 closed second mould assembly
60 third mould
61 first mould part (of third mould 60)
62 first mould cavity (of first mould part 61)
63 second mould part (of third mould 60)
64 first mould cavity (of second mould part 63)
66 closed third mould assembly
71 first web production station
72 second web production station
73 third web production station
75 web
80 transport arrow (to finalisation line)
100 longitudinal direction
101 direction of translation/shift
α angle

The invention claimed is:

1. A manufacturing line for manufacturing wind turbine blades having a composite shell structure comprising a matrix material and a fibre reinforcement material by use of a resin transfer moulding process, wherein a manufactured wind turbine blade has a length of at least 40 meters, characterised in that the manufacturing line comprises a plurality of moulds for forming wind turbine blades, each of the number of moulds comprising at least one mould part comprising a mould cavity, and that the manufacturing line further comprises a gantry means movable along the manufacturing line, the gantry means being adapted to arranging fibre reinforcement material in the mould cavity.

2. A manufacturing line according to claim 1, wherein the number of moulds are arranged in substantially longitudinal extension of a first mould.

* * * * *